United States Patent
Fernandez-Dorado et al.

(10) Patent No.: US 11,853,845 B2
(45) Date of Patent: Dec. 26, 2023

(54) MACHINE VISION SYSTEM AND METHOD WITH MULTI-APERTURE OPTICS ASSEMBLY

(71) Applicant: COGNEX CORPORATION, Natick, MA (US)

(72) Inventors: Jose Fernandez-Dorado, Aachem (DE); Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/010,332

(22) Filed: Sep. 2, 2020

(65) Prior Publication Data

US 2022/0067322 A1 Mar. 3, 2022

(51) Int. Cl.
*G06K 7/14* (2006.01)
*G02B 27/00* (2006.01)

(52) U.S. Cl.
CPC ....... *G06K 7/1465* (2013.01); *G02B 27/0075* (2013.01)

(58) Field of Classification Search
CPC .............. G06K 7/1645; G06K 7/1465; G02B 27/0075; G02B 21/0044; G02B 21/004; G02B 27/0127
See application file for complete search history.

(56) References Cited

U.S. PATENT DOCUMENTS

| | | | |
|---|---|---|---|
| 5,547,427 A | 8/1996 | Rigal et al. | |
| 5,911,638 A * | 6/1999 | Parente | A63B 60/00 473/409 |
| 6,304,540 B1 * | 10/2001 | Yoo | G02B 5/32 369/44.37 |
| 8,917,349 B2 | 12/2014 | Wajs | |
| 9,077,916 B2 * | 7/2015 | Wajs | H04N 1/409 |
| 9,495,751 B2 * | 11/2016 | Wajs | H04N 23/741 |
| 9,635,275 B2 | 4/2017 | Wajs | |
| 10,656,316 B2 * | 5/2020 | Moore | G02B 27/0025 |
| 11,367,221 B2 * | 6/2022 | Chang | H04N 23/84 |
| 2002/0021649 A1 * | 2/2002 | Yoo | G11B 7/123 |
| 2003/0029917 A1 | 2/2003 | Hennick et al. | |
| 2005/0094290 A1 * | 5/2005 | Ben-Eliezer | G02B 13/00 359/738 |

(Continued)

OTHER PUBLICATIONS

Bae et al., 4-mm-Diameter Three-Dimensional Imaging Endoscope with Steerable Camera for Minimally Invasive Surgery (3-D-MARVEL), Neurophotonics, 2017, 4(1):011008-1 thru 011008-7.

(Continued)

*Primary Examiner* — Daniel I Walsh
(74) *Attorney, Agent, or Firm* — Quarles & Brady LLP

(57) ABSTRACT

An apparatus for controlling a depth of field for a reader in a vision system includes a dual aperture assembly having an inner region and an outer region. A first light source can be used to generate a light beam associated with the inner region and a second light source can be used to generate a light beam associated with the outer region. The depth of field of the reader can be controlled by selecting one of the first light source and second light source to illuminate an object to acquire an image of the object. The selection of the first light source or the second light source can be based on at least one parameter of the vision system.

15 Claims, 11 Drawing Sheets

(56) References Cited

U.S. PATENT DOCUMENTS

| | | | |
|---|---|---|---|
| 2006/0171041 A1* | 8/2006 | Olmstead | G06K 7/10702 359/738 |
| 2006/0203214 A1* | 9/2006 | Shiraishi | G03F 7/70566 355/53 |
| 2007/0035852 A1* | 2/2007 | Farr | G02B 27/147 359/738 |
| 2007/0153542 A1* | 7/2007 | Gono | A61B 1/063 362/574 |
| 2007/0188601 A1* | 8/2007 | Rohaly | H04N 13/218 348/E13.021 |
| 2008/0308712 A1* | 12/2008 | Ono | H04N 9/04559 250/208.1 |
| 2009/0010494 A1* | 1/2009 | Bechtel | G06V 20/584 382/104 |
| 2009/0057413 A1* | 3/2009 | Vinogradov | G02B 27/20 235/462.35 |
| 2010/0066854 A1* | 3/2010 | Mather | H04N 9/083 348/222.1 |
| 2010/0165134 A1* | 7/2010 | Dowski, Jr. | G02B 13/0085 257/E31.127 |
| 2012/0008023 A1* | 1/2012 | Wajs | H04N 25/58 348/E9.04 |
| 2012/0154596 A1* | 6/2012 | Wajs | G06T 5/002 348/E5.09 |
| 2012/0290950 A1* | 11/2012 | Rapaport | H04L 51/52 715/753 |
| 2013/0021447 A1 | 1/2013 | Brisedoux et al. | |
| 2013/0033578 A1* | 2/2013 | Wajs | H04N 23/959 348/46 |
| 2013/0033579 A1* | 2/2013 | Wajs | G06T 7/571 348/46 |
| 2013/0113988 A1* | 5/2013 | Wajs | H04N 23/73 348/362 |
| 2013/0306880 A1* | 11/2013 | Yamano | G03B 15/14 362/293 |
| 2014/0185960 A1* | 7/2014 | Nordbryhn | G06K 7/10732 382/321 |
| 2015/0253487 A1* | 9/2015 | Nichol | G02B 6/0028 362/610 |
| 2015/0347799 A1* | 12/2015 | Gao | G06K 7/10831 235/454 |
| 2016/0011417 A1* | 1/2016 | Border | G02B 27/0176 359/630 |
| 2016/0042522 A1* | 2/2016 | Wajs | G02B 27/1013 348/335 |
| 2016/0216505 A1* | 7/2016 | Okudaira | G02B 21/367 |
| 2016/0227193 A1 | 8/2016 | Osterwood et al. | |
| 2016/0255334 A1* | 9/2016 | Wajs | H04N 13/254 382/154 |
| 2016/0267665 A1* | 9/2016 | Venkataraman | H04N 5/33 |
| 2016/0286199 A1* | 9/2016 | Wajs | H04N 13/25 |
| 2017/0150019 A1* | 5/2017 | Kyung | H04N 23/10 |
| 2017/0150061 A1* | 5/2017 | Shabtay | H04N 23/69 |
| 2017/0230638 A1* | 8/2017 | Wajs | H04N 13/254 |
| 2018/0052382 A1* | 2/2018 | Themelis | G02B 21/361 |
| 2018/0131853 A1* | 5/2018 | Pellman | H04N 23/71 |
| 2019/0094424 A1* | 3/2019 | Fernandez-Dorado | G02B 7/08 |
| 2019/0094658 A1* | 3/2019 | Rush | H04N 23/10 |
| 2019/0188432 A1 | 6/2019 | Lozano et al. | |
| 2019/0244379 A1* | 8/2019 | Venkataraman | G06T 7/55 |
| 2020/0410706 A1* | 12/2020 | D'Angelo | G06T 7/557 |
| 2021/0066375 A1* | 3/2021 | Kim | H01L 27/14621 |
| 2021/0368154 A1* | 11/2021 | D'Angelo | H04N 13/254 |
| 2022/0054761 A1* | 2/2022 | Helmer | A61M 5/24 |
| 2022/0067322 A1* | 3/2022 | Fernandez-Dorado | G06K 7/10732 |
| 2022/0237813 A1* | 7/2022 | Feng | G06V 10/10 |
| 2022/0239850 A1* | 7/2022 | Okada | H04N 5/225 |
| 2022/0271206 A1* | 8/2022 | Lopez | F21V 9/40 |
| 2023/0030276 A1* | 2/2023 | Fernandez-Dorado | G06K 7/10752 |

OTHER PUBLICATIONS

Koifman, Silicon File and Dual Aperture to Cooperate on 3D Gesture Tracking Sensor, Image Sensors World, Oct. 8, 2013, http://image-sensors-world.blogspot.com/2013/10/silicon-file-and-dual-aperture-to.html, 2 pages.

Koifman, e-WBM Publishes More Info on its Dual Aperture Depth Processor, Image Sensors World, May 1, 2017, http://image-sensors-world.blogspot.com/2017/05/ewbm-publishes-more-info-on-its-dual.html, 2 pages.

Martinello et al., Dual Aperture Photography: Image and Depth from a Mobile Camera, In 2015 IEEE International Conference on Computational Photography (ICCP), 2015, 10 pages.

PCT International Search Report and Written Opinion, PCT/US2021/048903, dated Jan. 12, 2022, 17 pages.

* cited by examiner

MACHINE VISION SYSTEM AND METHOD WITH MULTI-APERTURE OPTICS ASSEMBLY

FIELD

The present disclosure relates generally to machine vision systems and more particularly to an optics assembly with a multi-aperture for controlling the depth of field of a vision system.

BACKGROUND

Machine vision systems (also simply termed "vision systems") use image acquisition devices that include image sensors to deliver information on a viewed subject. The system can then interpret this information according to a variety of algorithms to perform programmed decision-making or identification functions. For example, an image of an object containing features of interest to the system can be acquired by an on-board image sensor (also referred to as simply an "imager" or "sensor") in the visible or near visible light range under appropriate illumination, which can be based upon ambient light or light provided by an internal or external illuminator.

A common task for vision systems is the reading and decoding of symbology (e.g., one-dimensional and two-dimensional codes—also termed "IDs"), which are used in a wide variety of applications and industries and can take the form of ID barcodes, 2D DataMatrix Codes, QR Codes and Dot-Codes, among other. The image sensor acquires images (typically grayscale or color, and in one, two, or three dimensions) of the subject or object, and processes these acquired images using an on-board or interconnected vision system processor. The processor often includes both processing hardware and non-transitory computer-readable program instructions (software) that perform one or more vision system processes to generate a desired output based upon the image's processed information. This image information is typically provided within an array of image pixels each having various colors or intensities. In the example of an ID reader (also termed herein, a "reader"), the user or an automated process acquires an image of an object that is believed to contain one or more barcodes, 2D codes or other ID types. The image is processed to identify encoded features, which are then decoded by a decoding process or processes to obtain the inherent alphanumeric data represented by the code.

SUMMARY

In accordance with an embodiment, a machine vision system can include an optics assembly with a fixed multi-aperture assembly and at least one lens, a sensor assembly including an image sensor and a processor device, and an illumination assembly. The illumination assembly can be configured to selectively illuminate an object for image acquisition using a first type of light or a second type of light. The fixed multi-aperture assembly can have a first region and a second region, the first region being configured to pass the first and second types of light and the second region being configured to filter the first type of light and pass the second type of light, so that illumination with the second type of light provides a larger light aperture than illumination with the first type of light. The processor device can be configured to: select at least one of the first or second types of light, based on analyzing at least one of a first image acquired by the sensor assembly or a first image acquisition process for the first image; control the machine vision system to acquire a second image using the selected at least one of the first or second types of light; and analyze the second image to decode a symbol in the second image.

In accordance with another embodiment, an apparatus for controlling a depth of field for a reader in a vision system can include an optics assembly, an image sensor, a first light source, a second light source and a processor device. The optics assembly can include a dual aperture assembly having an inner region and an outer region and at least one lens. The first light source is configured to generate a first light beam that is associated with the inner region of the dual aperture assembly. The second light source is configured to generate a second light beam that is associated with the outer region of the dual aperture assembly. The processor device is in communication with the optics assembly, the first light source and the second light source. The processor device is configured to control the depth of field of the reader by selecting one of the first light source or the second light source to illuminate an object to acquire an image of the object. The selection is based on at least one parameter of the vision system In accordance with another embodiment, a method for controlling a depth of field for a reader in a vision system can include acquiring a first image of an object using a first light beam of a first type of light and a first region of a multi-aperture assembly that is associated with the first type of light. At least one parameter associated with the first image can be determined. Based on the at least one parameter, a second image of the object can be acquired using a second light beam of a second type of light and a second region of the multi-aperture assembly that is associated with the second type of light. The second image can have a different depth of field than the first image.

BRIEF DESCRIPTION OF THE DRAWINGS

The present disclosure will hereafter be described with reference to the accompanying drawings, wherein like reference numerals denote like elements.

DETAILED DESCRIPTION

Figure 1:
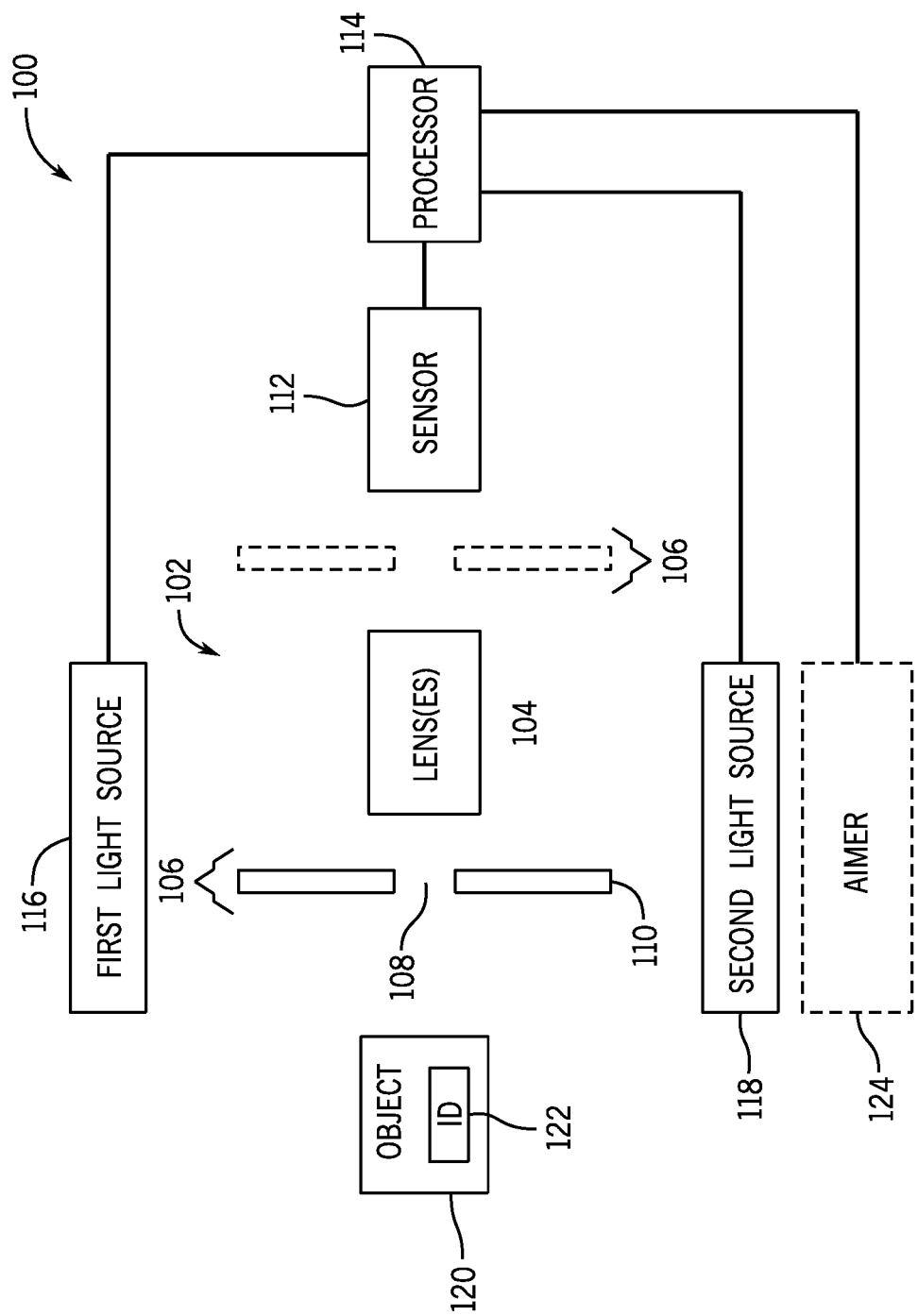
FIG. 1 is a schematic block diagram of a vision system with a dual aperture in accordance with an embodiment of the technology.

A common use for ID (e.g., barcode) readers is to track and sort objects along a line (e.g., a conveyor) in manufacturing and logistics operations. The ID reader, or more typically, a plurality (constellation) of readers can be positioned over the line at an appropriate viewing angle(s) to acquire any expected ID codes on the faces) of respective objects as they each move through the field of view. The ID reader can also be provided in a handheld configuration that allows the user to move from object to object, for example, on an inspection floor and vary the distance or relative angle between the reader and object surface at will. More generally, the focal distance of the ID reader with respect to the object can vary, depending on the placement of the reader with respect to the line and the size of the object.

In operation, some ID readers function to illuminate the scene containing one or more ID's (e.g., barcodes). This illumination can include aimers that project a colored dot on the region of interest in the imaged scene, whereby the user can center the image axis of the reader on the barcode within the imaged scene. Illumination can also include general illumination to allow acquisition of appropriately detailed images. The illuminated scene is then acquired by an image sensor within the imaging system through optics. The array of pixels of the sensor is exposed, and the electronic value(s) generated for each pixel by the exposure is/are stored in an array of memory cells that can be termed the "image" of the scene. In the context of an ID-reading application, the scene can include an object of interest that has one or more IDs of appropriate dimensions and type. The ID(s) are part of the stored image.

One important consideration for vision system applications is the depth of field (DOF) of images acquired with the system. For example, DOF can be a key design consideration in applications where the working distance to the target is variable. The DOF determines a range of distances from the reader at which an object is in focus (e.g., sharpness) in an acquired image. The DOF can be controlled by the size (e.g., diameter) of an aperture which determines the amount of light that enters the image sensor and is inversely proportional to the aperture size (commonly represented as an F number). Accordingly, a smaller aperture (larger F number) produces a larger DOF and a larger aperture (smaller F number) produces smaller DOF. A larger DOF allows objects at a wider range of distances from the reader to be in focus at the same time.

The optimal DOF can vary for different vision system applications, including between different images acquired by a particular vision system. If the DOF is not correct or appropriately optimized, the acquired image of an object can be blurred. Relatedly, because DOF is inversely related to aperture size, optimization of DOF may also relate to the amount of light that is admitted into an imaging system and, correspondingly, to the required exposure time to obtain a readable image. Although a large DOF is advantageous in many applications, smaller apertures can cause diffraction blur, which may limit the imaging and inspection of small features. Furthermore, a smaller aperture allows less light through the lens, and this can lead to larger exposure times. In application with moving objects, this may lead to motion blur.

In many conventional visions systems, a single fixed aperture is used. The aperture for a vision system is typically selected based on the expected working distance ranges for the particular application of the vision system. For example, an imaging device can be configured with a fixed aperture that provides the maximum DOF at the maximum working distance. In addition, the aperture is typically positioned in a lens assembly between various glass elements which makes it difficult to access the aperture. In many conventional systems, the aperture (and DOF) can only be changed by changing the lens of the system, which can be costly and complex, particularly for a vision system that has already been deployed in the field. In other conventional systems, the aperture may be changed mechanically, however, this typically is slower and has reliability concerns because of moving parts.

Among other aspects, the present disclosure describes a vision system (and related method) with a multi-aperture assembly that may be used to control the DOF. In some embodiments, the multi-aperture assembly can be a dual aperture assembly that includes two regions and each region can be sampled to provide a different aperture value and DOF. Accordingly, the two different regions on the aperture plane can allow the vision system to provide a small aperture or a large aperture, for example, for different working distances. For example, the dual aperture can include an inner region configured to provide a small aperture (and large DOF) and an outer region configured to provide a large aperture (and small DOF). Thus, depending on which region of the dual (or other multi-) aperture system is used, images with different DOFs can be readily obtained.

In some embodiments, a multi-aperture assembly can be a fixed aperture assembly, i.e., may not be mechanically or otherwise actuatable to change the physical size of a particular aperture. Rather, for example, different aperture regions may be configured to pass or filter certain types of light (e.g., certain wavelengths, polarization orientations, etc.), so that the effective total aperture size may vary depending on what type of light is used. For example, on various embodiments, a multi-aperture assembly can include an inner and outer regions that are configured to pass light of different wavelengths or polarization. Thus, the wavelength (or range of wavelengths) or polarization of a light beam used to illuminate an object for image acquisition can be changed to utilize either the inner region or the outer region of the aperture (or a combination thereof). For example, in some embodiments, the fixed multi-aperture assembly may include an inner region configured to pass a first type of light (e.g., based on wavelength or polarization) and a second type of light (e.g., based on wavelength or polarization) and an outer region configured to filter the first type of light and to pass the second type of light, so that illumination with the second type of light provides a larger aperture than illumination with the first type of light. This arrangement can therefore selectively provide different DOF and exposure times with which to acquire an image of, for example, a symbol on an object.

In some embodiments, multiple regions of a multi-aperture assembly can be concentric or otherwise similarly disposed and an inner (or outer) one of the regions can be configured to pass the same type(s) of light as an outer (or inner) one of the regions, whereas the outer (or inner) one of the regions may be configured to filter at least one type of light as is passed by the inner (or outer) one of the regions. Thus, for example, some types of light may result in an aperture for image acquisition that includes both of the inner and outer regions, whereas other types of light may result in an aperture for image acquisition that includes only the inner region.

In some embodiments, the size of particular regions of a multi-aperture assembly can be fixed, such that changes in the effective aperture size at the multi-aperture assembly for a particular image acquisition may not require any physical change in the size of an aperture through the assembly. For example, as also discussed below, some multi-aperture assemblies can be configured to provide different effective apertures sizes based on the filtering or passage of different light types at different regions thereof, and images with different DOFs can thus be acquired by changing the type of light used to illuminate a target for the images, rather than by mechanically (or otherwise) changing the size of any particular opening through which the image acquisition is effected.

In some embodiments, a vision system can be configured to select (e.g., automatically select) a particular type of light for image acquisition based on analysis of a previously acquired image, image-acquisition process, or other system parameter. For example, a first image can be acquired using one region of a dual aperture assembly and one or more parameters of the system associated with the first image (e.g., parameters of one or more components of the system, parameters of an image generated by the system, or parameters of an object being imaged) can be used to determine the optimal aperture for subsequent image acquisitions. As appropriate, a second image can then be acquired using another region of the dual aperture assembly, which may effectively provide a different aperture size than was used for the first image.

Advantageously, some embodiments of a multi-aperture assembly can allow the aperture to be optimized for a particular application or image acquisition. For example, a larger aperture can be used for high resolution images or a smaller aperture can be used for reading an ID (e.g., a barcode) over a longer working distance, without requiring changing out the aperture (or lens) elements or mechanically adjusting the aperture. Further, multiple images of a particular ID may be acquired with different depths of field to improve analysis of the particular ID. Thus, in some embodiments, a multi- (e.g., dual) aperture assembly can allow a reader to have an extended reading range for large and small IDs.

FIG. 1 is a schematic block diagram of a vision system 100 with a dual aperture in accordance with an embodiment of the technology. Although the vision system 100 is illustrated with a dual aperture arrangement, other examples can include more than two apertures, as configured and operated in accordance with the general principles disclosed herein.

In particular, the vision system 100 includes an optics assembly 102, an image sensor 112, a processor 114, a first light source 116 and a second light source 118 and can be used to acquire an image of an ID (e.g., a barcode) 122 on an object 120. In the illustrated embodiment, the optics assembly 102 includes a lens arrangement 104 and a dual aperture assembly 106. The various embodiments described here may be implemented on different types of vision systems including, but not limited to, hand held, other mobile or fixed mount ID readers. It should be noted that that the depicted arrangement of components is illustrative of a wide range of layouts and component types. The illustrated embodiment is thus, provided to teach a possible arrangement of components that provide the functions of the illustrative embodiment, although other embodiments can exhibit other configurations. For example, the aperture assembly may be a multi-aperture assembly such as a quadruple aperture assembly as discussed further below.

As mentioned, the vision system 100 can be used to acquire an image of an exemplary ID 122, for example, in the form of a barcode, on the object 120. Thus, the optics assembly 102 is placed in front of the image sensor 112. The lens arrangement 104 of the optics assembly 102 includes a series of lenses that project the images light onto the area of the sensor 112. In some embodiments, the lens arrangement 104 includes at least one liquid lens, as may allow for rapid and automated adjustment of focus for images at different working distances.

Generally, a multi-aperture assembly can be configured with multiple regions, which can be selectively employed to acquire images with different DOFs, by selectively using illumination with different light types that correspond to different regions (or combinations thereof). In the illustrated embodiment, the dual aperture assembly 106 includes an inner region (or small aperture) 108 and an outer region (or larger aperture) 110. The dual aperture assembly 106 may be formed with a circular shape (e.g., a disk or ring) as discussed further below with respect to FIG. 2. In some embodiments, the dual aperture assembly 106 may be positioned in front of the lens arrangement 104. Although the illustrated arrangement of the optics assembly 102 and dual aperture assembly 130 can be advantageous, other configurations are also possible. For example, the dual aperture assembly 106 may be positioned in back of the lens arrangement 104 as illustrated with dashed lines. In another example, the dual aperture assembly 106 may be positioned or embedded in the lens assembly 102.

In different embodiments, different illumination assemblies can be used to selectively provide illumination with different types of light (e.g., light of wavelength bands centered on particular colors of the visible spectrum, light of different polarization orientations, etc.). In the illustrated example, the first light source 116 and the second light source 118 can each include an LED or laser diode to provide illumination light of a particular type. For example, the light emitted by the first light source 116 can define a wavelength (or range of wavelengths) distinct from the light provided by the second light source 118. Accordingly, the light emitted by the second light source 118 can define a wavelength (or range wavelengths) distinct from the light provided by the first light source 116. For example, the first light source 116 can project in the blue wavelength range (e.g., 450-490 nm) as may be conducive for high quality image acquisition and the second light source 118 can project in the red wavelength range (e.g., 610-640 nm) as may be conducive to high quality image acquisition. In other examples, light sources that project in the green, yellow or white, or other wavelength ranges may be used. In other examples, the first light source 116 or the second light source 118 can project light in the near IR or UV range. In other examples, the light emitted from the first light source 116 can define a polarization distinct from the light provided by the second light source 118 (e.g., with a 45- or 90-degree difference in polarization orientation). Accordingly, the light emitted by the second light source 118 can define a polarization distinct from the light provided by the first light source 116.

The first light source 116 is configured to project a light beam onto the object 120 and barcode 122 to acquire an image. The second light source 118 is configured to project a light beam onto the object 120 and barcode 122 to acquire an image, and can be controlled by the processor 114 independently from the first light source 116. In various embodiments, including as described below, the first light source 116 and the second light source 118 are used to project a light beam at different times to obtain different individual images.

In some embodiments, the inner region 108 of the dual aperture assembly 106 is configured to allow the light from the first light source 116 reflected by the object 120 to pass through and the outer region 110 of the dual aperture assembly 106 is configured to prevent (or block) the light from the first light source 116 reflected by the object 120 from passing through (e.g., to filter 85% or more of the light from the first light source 116). The outer region 110 of the dual aperture assembly 106 can be configured to allow the light from the second light source 118 reflected by the object 120 to pass through and the inner region 108 can be configured to allow the light from the second light source 118 reflected by the object 120 to pass through. Accordingly, light from the second light source 118 reflected by the object 120 passes through the whole diameter of the aperture assembly 106 (i.e., the combined diameter of the inner region 108 and the outer region 110), whereas light form the first light source 116 reflected by the object 120 passes through the diameter only of the inner region 108. Accordingly, the first light source 116 and the inner region 108 of the dual aperture assembly 106 can be used to acquire an image using a small aperture, large DOF and longer exposure time. In contrast, the second light source 118 and the inner and outer regions 108, 110 of the dual aperture assembly 106 can be used to acquire an image using a large aperture, small DOF, and shorter exposure time.

Thus, as discussed further below, the DOF used to acquire an image can be controlled by selecting one of the first light source 116 (which is associated with the inner region 108) or the second light source 118 (which is associated with the outer region 110) to illuminate the object. In some embodiments, a first image is acquired using one of the regions 108, 110 of the dual aperture assembly 106 and one or more parameters of the system (e.g., parameters of one or more components of the system, parameters of an image generated by the system, or parameters of an object being imaged) can be used to determine the optimal aperture which may then be used to acquire a second image. For example, a first image can be acquired using only the first light source 116, as a default setting, which may result in a relatively large DOF. Depending on the results of the image acquisition (or other factors), a second image can then be acquired again using only the first light source 116, or using the second light source 118, as may result in a relatively small DOF (but also, for example, a shorter exposure time for a desired image intensity).

In some embodiments, the system 100 may also include an aimer 124. To ensure that the barcode 122 is properly imaged, the barcode 122 may be required to be properly oriented relative to the system 100 (e.g., centered and fully within a field of view of the system 100). The aimer 124 can be used to project an aimer pattern that may be directed by a user of system 100 onto the barcode 122. This can help ensure that the barcode 122 resides fully within the field of view for image acquisition. In some embodiments, the light beam projected by aimer 124 to generate the aimer pattern may be substantially coaxial (on-axis) with a reader optical axis. Other components can also be used, in some embodiments. For example, some embodiments can include a range finder or dimensioner, which may be part of the aimer 124 or may be part of a separate sub-assembly. In some cases, selection of a desired DOF, as may inform selection of one of the light sources 116, 118, may be based upon analysis of a distance to a particular object or a dimension of the particular object, including as also discussed below.

As mentioned above, the system 100 also includes the image sensor 112 and the associated processor 114. Light from the first 116 or second 118 light source that is reflected from the subject (e.g., barcode 122 on object 120) back to the vision system 100 is directed through the corresponding region (108, 110) of the dual aperture assembly 106 and the lens arrangement 104 along a reader optical axis to the image sensor 112. The image sensor 112 can be configured to detect different wavelengths of light or can also be configured to detect different polarizations of light. The reflected light is received by the image sensor 112 for processing (e.g., by processor 114) to, for example, generate an image of the subject and perform analysis of the generated image, as described further below. Known methods may be used for generating an image of the scene and decoding data therein.

In some embodiments, the processor 114 can include one or more processor devices that can be provided on one or more circuit boards and operatively interconnected by the appropriate ribbon cable(s) or other communication channels (not shown). The processor 114 can be configured to control vision system analysis processes (e.g., ID reading and decoding) as well as other functions, such as projection of an aimer beam, illumination for image acquisition (e.g., timing of illumination), automatic focus adjustment, selection of a light source (and corresponding aperture region) for illumination, etc. System 100 may also be configured to wirelessly transmit (via a wireless link, not shown) decoded data to a data handling device such as an inventory tracking computer or logistics application. Alternatively, the system 100 may be wired to a data handling device/network or can store and subsequently transfer collected information when it is connected to a base unit. The processor 114 may be in communication with the image sensor 112, the first light source 116, the second light source 118 and, in certain embodiments, the aimer 124, as well as a variety of other components (not shown), such as motors for adjustment of system orientation, or a variety of other actuators.

Figure 2A:
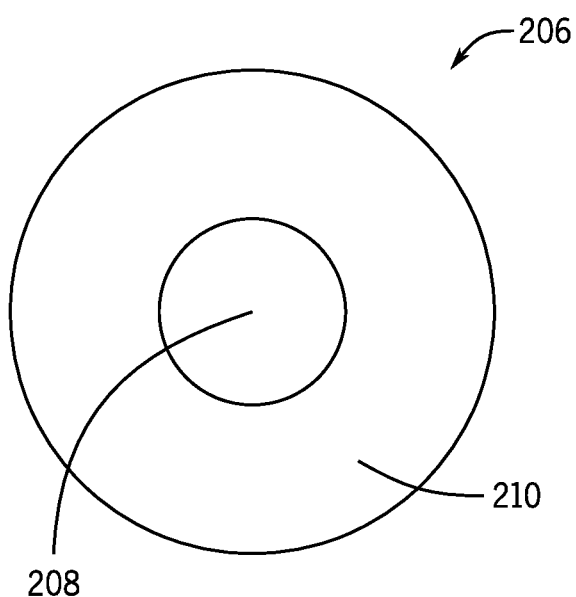
FIG. 2A is a front view of a dual aperture assembly in accordance with an embodiment of the technology.

In different embodiments, different regions of a multi-aperture assembly can be formed in different ways. In some embodiments, as also noted above, regions can be overlapping or can be concentrically located. Further, selective blocking (e.g., filtering) or passage of particular light types can be achieved in a variety of ways. As one example, FIG. 2A is a front view of a dual aperture assembly in accordance with an embodiment of the technology. In the illustrated embodiment, dual aperture assembly 206 has a circular shape (e.g., a disk or ring) and includes an inner region 208 (or small aperture) and an outer region 210 (or large aperture). In some embodiments, the dual aperture assembly 206 may be formed from a filter material. A hole or circular region may be drilled in the center of the filter material to form the inner region or small aperture 208 and the outer region (or large aperture) 210 may be a ring shape of the filter material. In other embodiments, the dual aperture assembly 206 may be disk shaped and formed from a transparent material. The outer region (or larger aperture) 208 may be formed by applying a filter material (e.g., a film) on the outer rim of the transparent disk. In the various embodiments of the dual aperture assembly 206, the filter material may be, for example, a material configured to allow a particular wavelength (or range of wavelengths) of light to pass through while blocking other wavelengths. In another example, the filter material may be a material (e.g., a polarizer) configured to allow light waves of a particular polarization to pass through while blocking light waves of other polarizations. As discussed above, a first type of light (wavelength or polarization) will go through the complete diameter of the dual aperture assembly 206 (i.e., the combined diameter of the inner and outer regions 208, 210) and a second type of light (wavelength or polarization) will go through only the inner region 208 (or small aperture). While the exemplary embodiment illustrated in FIG. 2 has a circular shape for the inner region 208 and outer region 210, it should be understood that the dual aperture assembly 206 may be implemented with other shapes. Likewise, other multi-aperture assemblies can be formed according to similar principles, but with more than two regions.

Figure 2B:
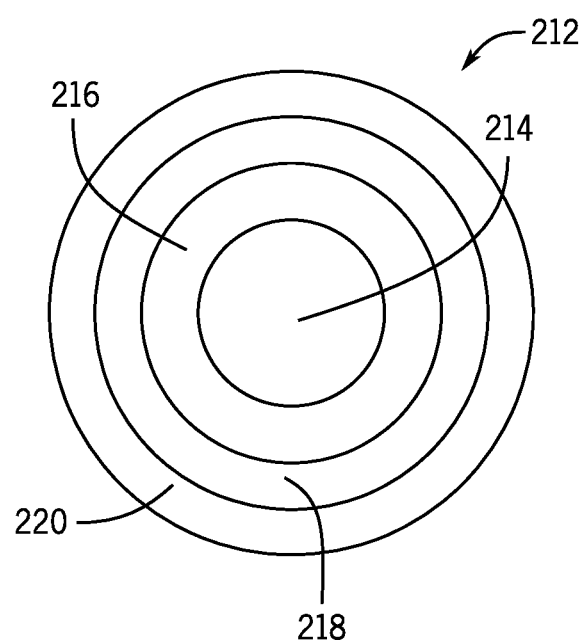
FIG. 2B is a front view of a quadruple aperture assembly in accordance with an embodiment of the technology.

As another example, FIG. 2B is a front view of a quadruple aperture assembly in accordance with an embodiment of the technology. In the illustrated embodiment, quadruple aperture assembly 212 has a circular shape (e.g., a disk or ring) and includes multiple concentric regions, in particular, a first (or inner) region 214 (the smallest aperture in the assembly 212), a second region 216, a third region 218 and a fourth (or outer) region 220 (or the largest aperture in the assembly 212). As mentioned above, in some embodiments, the quadruple aperture assembly 212 may be formed from a filter material (or materials). A hole or circular region may be drilled in the center of the filter material to form the inner region or small aperture 214 and the outer regions 216, 218, 220 (which can provide larger apertures) may be a ring shape of the filter material(s). In some cases, successively smaller holes through different layers of filter material can provide a geometry similar to that shown in FIG. 2B. In some embodiments, the quadruple aperture assembly 212 may be disk shaped and formed from a transparent material. The outer regions 216, 218 and 220 may be formed by applying filter materials (e.g., a film) in concentric regions from an outer edge of the inner region to the outer rim of the transparent disk. In the various embodiments of the quadruple aperture assembly 212, the filter material used for each of the outer regions 216, 218, 220 may be, for example, a material configured to allow a particular wavelength (or range of wavelengths) of light to pass through while blocking other wavelengths.

In an example, the inner region 214 of the quadruple aperture assembly 212 can be configured to allow four different types of light with different wavelengths (e.g., red, yellow, green, blue) to pass through the aperture defined by the inner region 214. In this example, the second region 216 can be configured to filter at a first type of light from the four different types of light (e.g., red), the third region 218 can be configured to filter the first type of light and a second type of light from the four different types of light (e.g., red and yellow), and the fourth region 220 can be configured to filter the first type of light, the second type of light and a third type of light from the four different types of light (e.g., red, yellow and green). Accordingly, the first region 214 and the second region 216 define an aperture larger than the aperture defined by the first region 214. The first 214, second 216 and third 218 regions define an aperture larger than both the aperture defined by the first region 214 and the aperture defined by the first 214 and second 216 regions. The first 214, second 216, third 218 and fourth region 220 define an aperture larger than the aperture defined by the first region 214, the aperture defined by the first 214 and second 216 regions and the aperture defined by the first 214, second 216 and third 218 region. As discussed above, the size of aperture used from the quadruple aperture assembly 212 may be selected based on the type of light used for illumination.

Figure 2C:
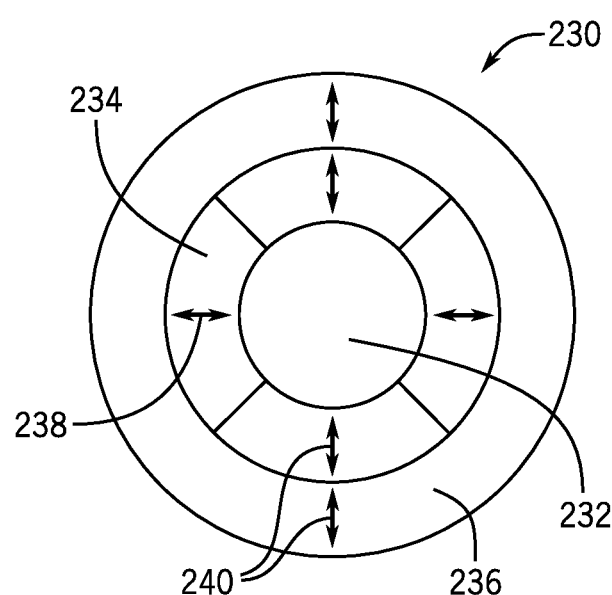
FIG. 2C is a front view of a tri-aperture assembly in accordance with an embodiment of the technology.

As yet another example, FIG. 2C is a front view of a tri-aperture assembly in accordance with an embodiment of the technology. In the illustrated embodiment, tri-aperture assembly 230 has a circular shape (e.g., a disk or ring) and includes multiple concentric regions, in particular, a first (or inner) region 232 (the smallest aperture in the assembly 230), a second region 234, and a third region 236 (or the largest aperture in the assembly 230). As mentioned above, in some embodiments, the tri-aperture assembly 230 may be formed from a filter material (or materials). A hole or circular region may be drilled in the center of the filter material to form the inner region or small aperture 232 and the outer regions 234, 236 (which can provide larger apertures) may be a ring shape of the filter material(s). In some cases, successively smaller holes through different layers of filter material can provide a geometry similar to that shown in FIG. 2C. In some embodiments, the tri-aperture assembly 230 may be disk shaped and formed from a transparent material. The outer regions 234, 236 may be formed by applying filter materials (e.g., a film) in concentric regions from an outer edge of the inner region to the outer rim of the transparent disk. In the various embodiments of the tri-aperture assembly 230, the filter material used for each of the outer regions 234, 236 may be, for example, a material configured to allow a particular polarization (or a plurality of polarizations) of light to pass through while blocking other polarizations.

In an example, the inner region 232 of the tri-aperture assembly 230 can be configured to allow multiple polarization directions of light to pass through the aperture defined by the inner region 232 (e.g., the inner region 232 may be transparent material or a hole). In this example, the second region 234 can be configured to filter a first polarization direction 238 of light and a second polarization direction of light 240 and the third region 236 can be configured to filter the second polarization direction 240 of light. Accordingly, the first region 232 and the second region 234 define an aperture larger than the aperture defined by the first region 232. The first 232, second 234 and third 236 regions define an aperture larger than both the aperture defined by the first region 232 and the aperture defined by the first 232 and second 234 regions. As discussed above, the size of aperture used from the tri-aperture assembly 230 may be selected based on the type of light used for illumination.

Figure 3:
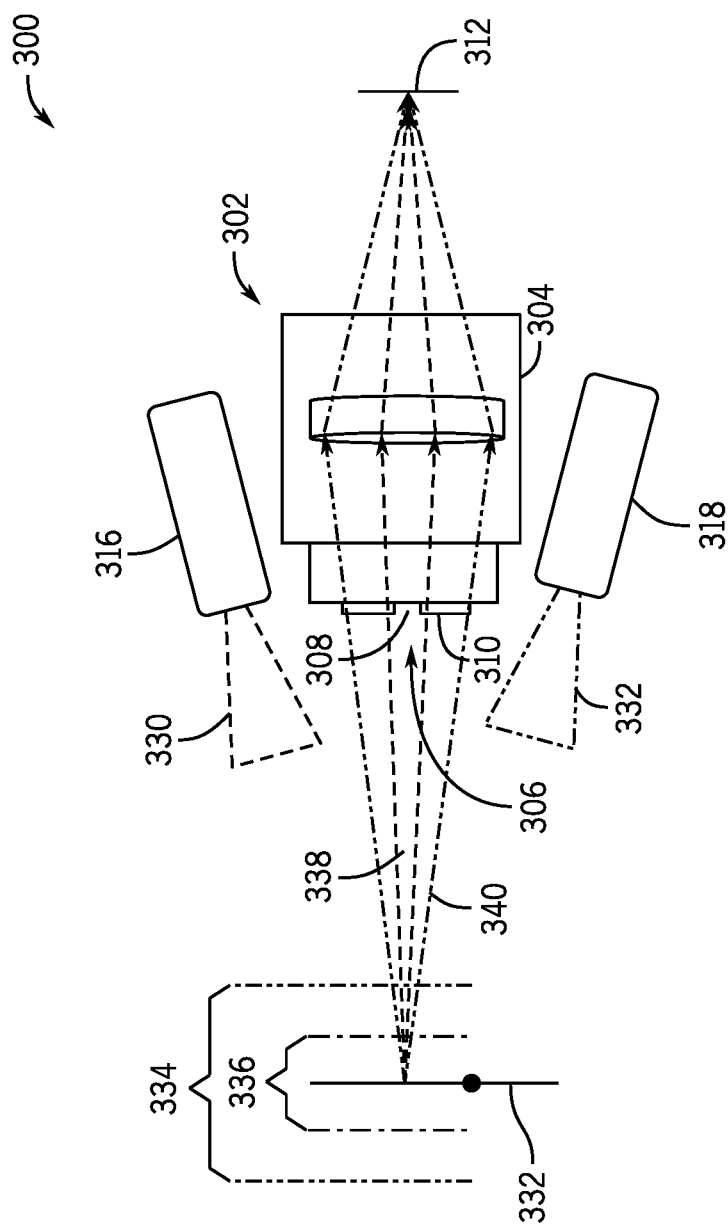
FIG. 3 is a schematic diagram of an illumination apparatus and an optics assembly with a dual aperture in accordance with an embodiment of the technology.

As mentioned, different regions of a dual aperture assembly can be used with corresponding light sources to acquire images with different DOFs. FIG. 3 is a schematic diagram of an illumination apparatus and an optics assembly with a dual aperture, included in a vision system 300 in accordance with an embodiment of the technology. In some cases, the vision system 300 can be a particular implementation of the vision system 200, although other configurations are also possible. To acquire an image using the inner region 308 (small aperture) of the dual aperture assembly 306 and a larger DOF 334, a first light source 316 projects a light beam 330 having a particular wavelength (or range of wavelengths) or polarization on a target 322 (e.g., a barcode). The reflected light 338 of the first light beam passes through the inner region 308 of the dual aperture assembly 306 and is blocked by the outer region 310. The reflected light 338 is then directed to the image sensor 312 by one or more lenses of the lens arrangement 304. To acquire an image using the outer region 310 (large aperture) of the dual aperture assembly 306 and a smaller DOF 336, a second light source 318 projects a light beam 332 having a particular wavelength (or range of wavelengths) or polarization on the target 322 (e.g., a barcode). The reflected light 340 of the second light beam passes through the entire diameter of the dual aperture assembly 306 (i.e., a combined diameter of the inner region 308 and the outer region 310) and is directed to the image sensor 312 by one or more lenses of the lens arrangement 304. In the illustrated embodiment, the first region 308 and the second region 310 of the dual aperture assembly 306 have the same focal point for the first light beam 330 and the second light beam 332. The image sensor 312 can include rows and columns of photosensitive sites (pixels) that form a pixel array. When the reflected light (338 or 340) is projected by the lens arrangement 304 onto the image sensor 312, each pixel produces a signal which is proportional to the light incident on that pixel. In some embodiments, the sensor 312 is a monochrome sensor. The dual aperture assembly can be used to, for example, acquire individual images at different times using the different regions and the corresponding light source. Accordingly, depending on the wavelength or polarization used to illuminate the target 322, the reader will have a different aperture value and, thus, a different DOF and exposure time for acquiring an image.

Figure 4:
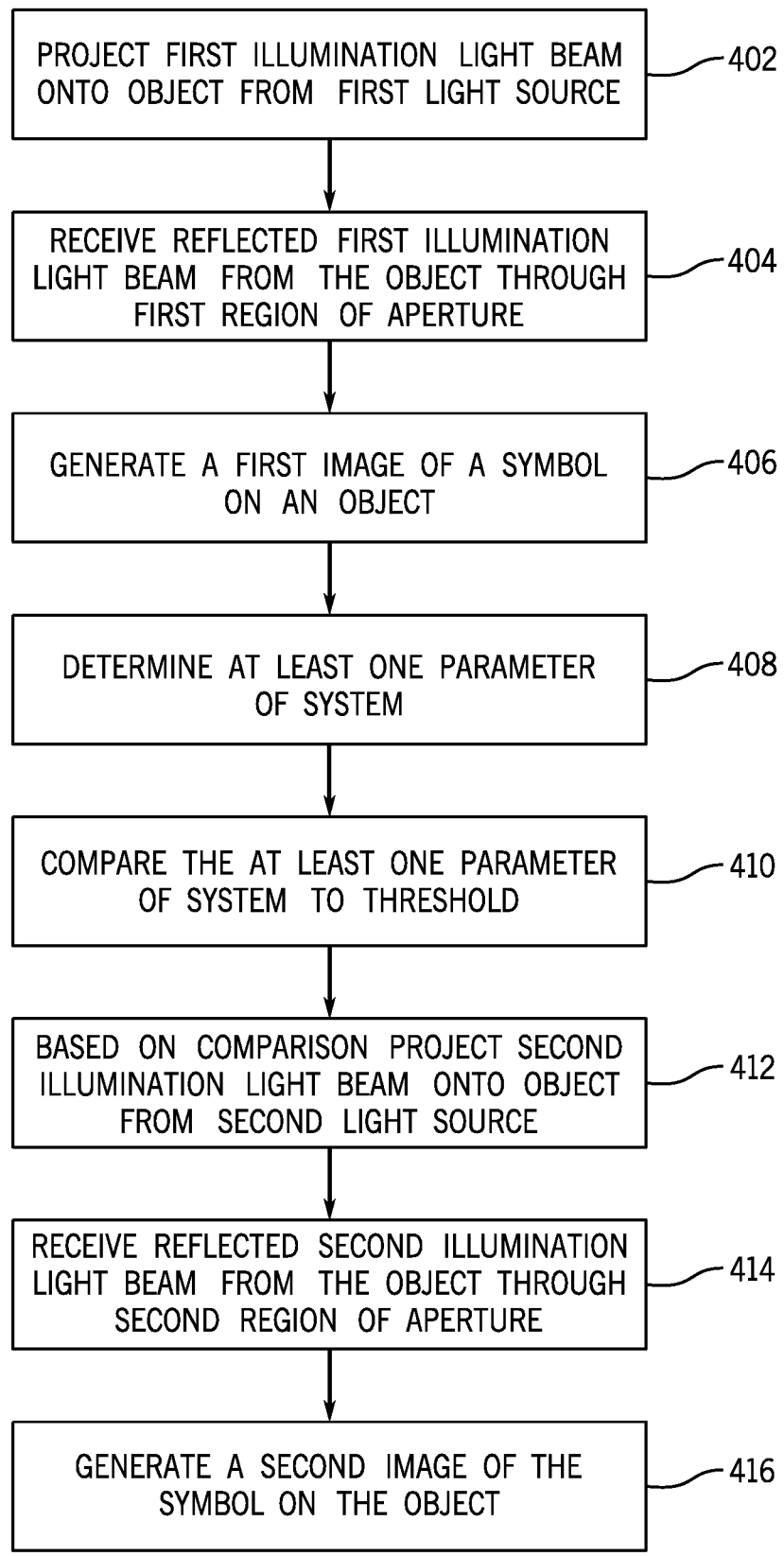
FIG. 4 illustrates a method for controlling a depth of field of a vision system using a multi-aperture assembly in accordance with an embodiment of the technology.

As mentioned above, in some embodiments, a first image is acquired using one region of a dual aperture assembly and one or more parameters of the system (e.g., parameters of one or more components of the system, parameters of an image generated by the system, or parameters of an object being imaged) can be used to determine the optimal aperture which may then be used to acquire a second image. FIG. 4 illustrates a method for controlling a depth of field of a vision system using a dual aperture in accordance with an embodiment of the technology. At block 402, a first illumination light beam is projected from a first light source onto a symbol (e.g., a barcode) on the object. At block 404, reflected light is received by the vision system from the object based on the first illumination light beam and passes thorough a first region of a dual aperture assembly. In some embodiments, the first region is an inner region providing a small aperture and in other embodiments, the first region is an outer region providing a larger aperture. At block 406, a first image of the symbol on the object is generated using the vision system. For example, as discussed above, the reflected light that passes through the first region of the dual aperture may then be directed by a lens assembly to an image sensor. A processor may then be used to generate the first image of the symbol and perform analysis of the generated image. Known methods may be used for generating an image of the symbol and decoding data therein.

At block 408, at least one parameter of the system is determined. The at least one parameter can be a parameter of one or more components of the system, for example, an exposure time, DOF, etc. The at least one parameter may also be a parameter of the first image generated by the system, for example, pixel values relating to saturated areas, hot spots, stray lights, etc. Known methods in the art for processing optical signals may be used to analyze the first image. In addition, the at least one parameter may be a parameter of the object being imaged, for example a height or other dimension of the object, or a distance from the object to the imaging device.

Generally, the at least one parameter can be analyzed in order to determine an appropriate (e.g. optimized) DOF for the second image, and illumination for the second image can then be controlled accordingly. In some embodiments, analysis of the at least one parameter can include comparing the at least one parameter to a threshold value (e.g., a maximum exposure time threshold). For example, at block 410, the at least one parameter is compared to a threshold to determine if a second image should be acquired using a different region of the dual aperture assembly than was used for the acquisition of the first image. According, the aperture value and DOF may be changed for the acquisition of the second image. Based on the comparison, or other relevant analysis, a second illumination light beam is projected from a second light source onto the symbol (e.g., a barcode) on the object at block 412. At block 414, reflected light is received by the vision system from the object based on the second illumination light beam and passes thorough a second region of a dual aperture assembly. In some embodiments, the second region is an inner region providing a small aperture and in other embodiments, the second region is an outer region providing a larger aperture. At block 416, a second image of the symbol on the object is generated using the vision system. For example, as discussed above, the reflected light that passes through the second region of the dual aperture may then be directed by a lens assembly to an image sensor. A processor may then be used to generate the second image of the symbol and perform analysis of the generated image. Known methods may be used for generating an image of the symbol and decoding data therein.

In some embodiments, the second image generated at block 416 can be analyzed individually in order to identify relevant information (e.g., to decode an ID in the image). For example, where a DOF for the second image has been determined to be more optimal for a particular application than a DOF for the first image, the second image can be analyzed without combining the second image with the first image, in order to extract relevant information from the second image.

Figure 5:
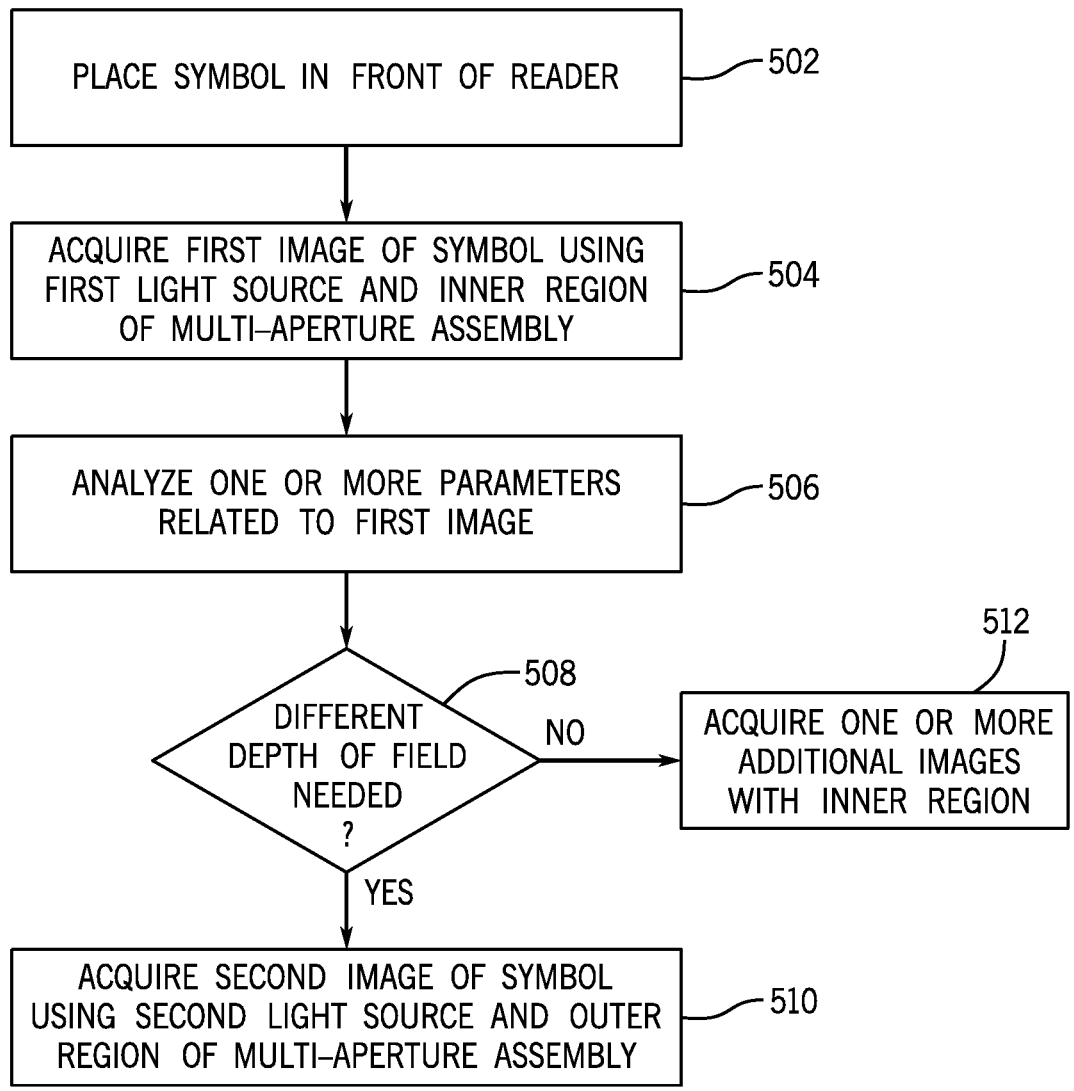
FIG. 5 illustrates a method for using a multi-aperture assembly, such as to avoid over-exposed images and motion blur when acquiring an image of a symbol on an object in accordance with an embodiment of the technology.

In an embodiment, a multi-aperture assembly may be utilized in a vision system to avoid over exposed images and motion blur when acquiring an image of a symbol (e.g., a barcode) on an object as illustrated in FIG. 5. In this application, at block 502 the barcode can be placed in front of a reader, e.g., a hand held or fixed mount reader. At block 504, the reader may then be operated to take a first image of the barcode using a first light source and a corresponding an inner region (or small aperture) of a dual aperture (or other multi-aperture) assembly to maximize the DOF for the acquired image. For example, the inner region may be used to acquire the first image based on an auto brightness functionality incorporated into the reader that automatically selects the inner region for image acquisition.

Once the first image has been acquired, one or more parameters relating to the first image can then be analyzed at block 506 in order to determine whether a different DOF may be appropriate for a second (subsequent) image. For example, the vision system may have a predetermined maximum exposure time threshold. The maximum exposure time threshold may be predetermined based on different parameters such as, for example, electrical duty cycle of different components of the vision system, timing of the application or motion blur. The exposure time of the inner region (small aperture) for the first image can be compared to the predetermined maximum exposure time threshold. If the exposure time for the inner region reaches (or exceeds) the maximum exposure time threshold at block 508, the system can switch to a second light source that corresponds to the outer region (large aperture) of the dual aperture assembly to acquire a second image of the symbol on the object at block 510 with a smaller DOF but also a shorter exposure time. If the maximum exposure time threshold for the inner region is not reached at block 508, the system may continue to acquire images with the first region (small aperture) at block 512. As long as the maximum exposure threshold for the small aperture is not reached, the small aperture may provide enough light, optimize the DOF, and minimize motion blur risks.

Figure 6:
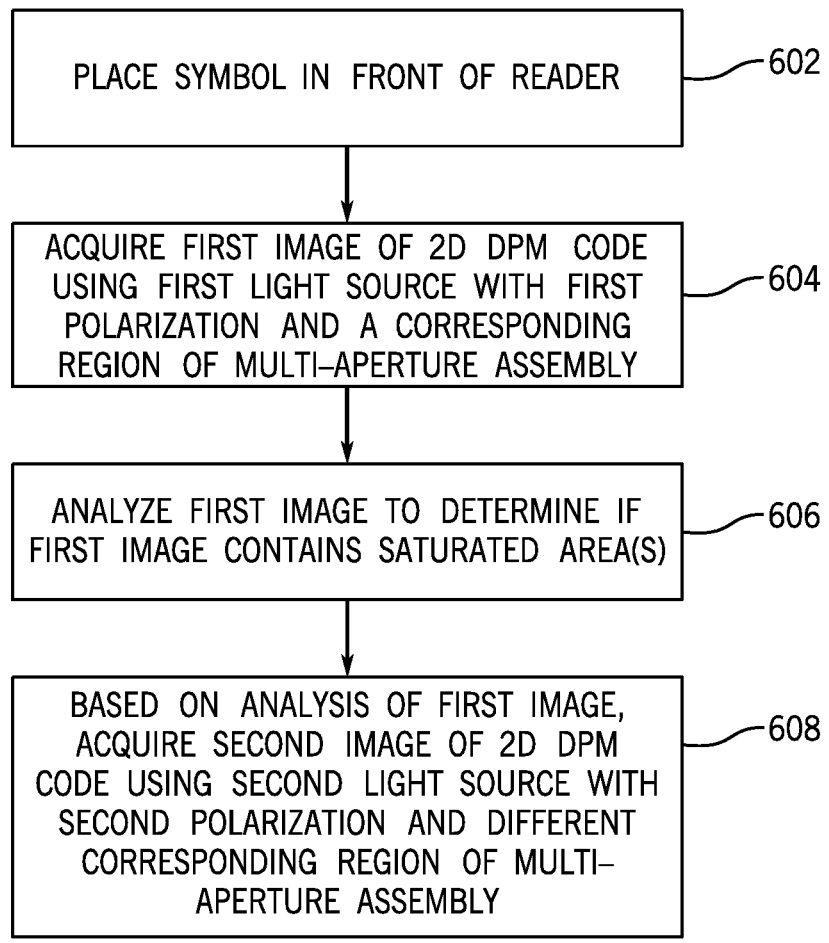
FIG. 6 illustrates a method for using a multi-aperture assembly that employs polarized light, such as for imaging in direct part marking applications in accordance with an embodiment of the technology.

In an embodiment, a multi-aperture assembly that employs polarized light may be utilized in a vision system for imaging in direct part marking (DPM) applications as illustrated in FIG. 6. A direct part marking reader is capable of reading barcodes that are etched or imprinted directly onto the surface of materials such as plastics and metals. Typically, DPM parts present codes on a large variety of geometries and surfaces. However, two-dimensional (2D) codes marked on, for example, shiny or round parts to be imaged can present a challenge to a reader. To address this issue (or others), a reader, e.g., a hand held or fixed mount reader, can include a dual aperture (or other multi-aperture) assembly with an inner region and an outer region based on polarizing filters, and an image sensor that is a polarized sensor. In some embodiments, the polarized sensor can have a one-quarter (¼) of nominal resolution for four different polarizing light directions (e.g., 0°, 45°, 90° and 135°). However, in DPM applications, typically the working distances are small enough that images may be acquired with sufficient magnification even with this reduction in nominal resolution. Further, magnification may also be used to address the reduction of the amount of accessible pixels on the polarized sensor which is a result of the polarization filters used on the polarized sensor.

In an example application, at block 602 a part with a 2D DPM code can be placed in front of the reader. At block 604, the reader may then be operated to acquire a first image of the barcode using a first light source with a first polarization and a corresponding region of the dual aperture assembly. The region may be, for example, an inner region or small aperture or an outer region or large aperture. In this embodiment, the region of the dual aperture assembly used for acquiring the first image may be selected based on an auto brightness functionality incorporated into the reader so that, for example, the first image is acquired with the best contrast on the first image. The first image may then be analyzed at block 606 to determine if the image includes any saturated areas. Known methods in the art for processing optical signals may be used to analyze pixel values of the first image to identify any saturated areas. If the first image includes saturated areas, at block 608 a second light source with a different polarization than the first light source may then be used to illuminate the 2D code and acquire a second image. The second light source is associated with a different region of the dual aperture assembly that the first light source. Accordingly, the different region of the dual aperture assembly can be used to acquire the second image of the 2D code.

In some embodiments, the reader may be configured to take further advantage of the pixel architecture of the imaging sensor. For example, the aperture can be sampled up to four times based on the four different directions of the polarized light.

Figure 7:
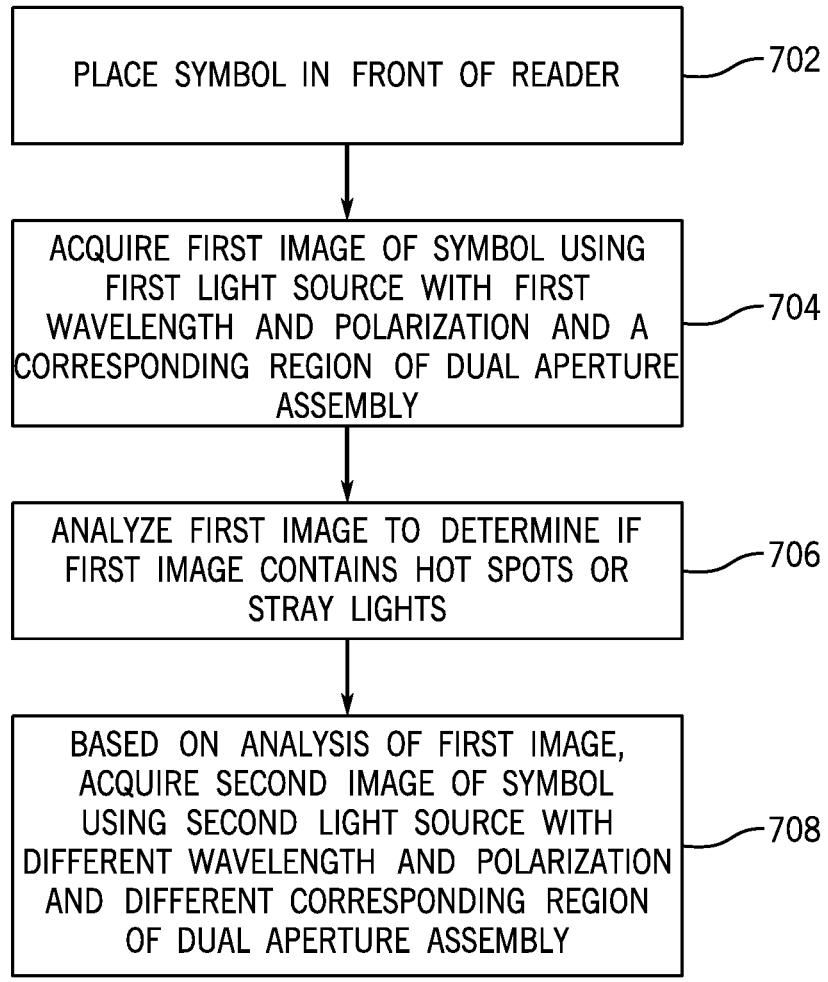
FIG. 7 illustrates a method for using a dual aperture assembly, such as to maximize brightness and reduce hot spots when acquiring an image of a symbol on an object in accordance with an embodiment of the technology.

In an embodiment, a dual aperture assembly may be utilized in a vision system to maximize brightness and reduce hot spots when acquiring an image of a symbol (e.g., a barcode) on an object as illustrated in FIG. 7. As mentioned above, a dual aperture (or other multi-aperture) assembly, an image sensor and light sources of the visions system can be configured for polarized light. Likewise, a polarized image sensor can be configured with one-quarter (¼) of nominal resolution for four different polarizing light directions (e.g., 0°, 45°, 90° and 135°). In some embodiments, the polarized image sensor may also include a typical Bayern pattern (i.e., an RGB Bayern filter) placed on top of a group (e.g., four) pixels of the image sensor that are configured to sense the different (e.g., four) directions of the polarized light. The color information provided by the RGB Bayern filter may be used by the vision system.

In an example application, at block 702 a barcode can be placed in front of a reader, e.g., a hand held or fixed mount reader. At block 704, the reader may then be operated to take a first image of the barcode using a first light source with a first wavelength and polarization and a corresponding region of the dual aperture assembly. In one embodiment, the region is the outer region or large aperture so that the first image is acquired with the maximum aperture to maximize brightness with minimum exposure time. The first light source may be configured to project, for example, a red wavelength with 0° of direction of polarization. The first image may then be analyzed at block 706 to determine if the image includes hot spots or stray light. Known methods in the art for processing optical signals may be used to analyze pixel values of the first image to identify any hot spots or stray light. If the first image includes hot spots or stray light, at block 708 a second light source with a different wavelength and polarization than the first light source is used to illuminate the barcode and acquire a second image. The second light source is associated with a different region of the dual aperture assembly that the first light source. Accordingly, the different region of the dual aperture assembly can be used to acquire the second image of the barcode. The second light source may also be selected to provide a shorter wavelength that results in more contrast. For example, the second light source may be configured to project a blue wavelength and 90° of direction of polarization. In this case, the modular transfer function (MTF) cut off is larger. Accordingly, the second image can be analyzed to determine frequency and other details in addition to the stray light issues.

In another example, the second light source may be configured to project a green wavelength and a directions of polarization between 0° and 90°. In this case, the region of the dual aperture assembly associated with the second light source and used to acquire the second image can be the regions associated with the 45° and 135° directions of the polarization.

Figure 8:
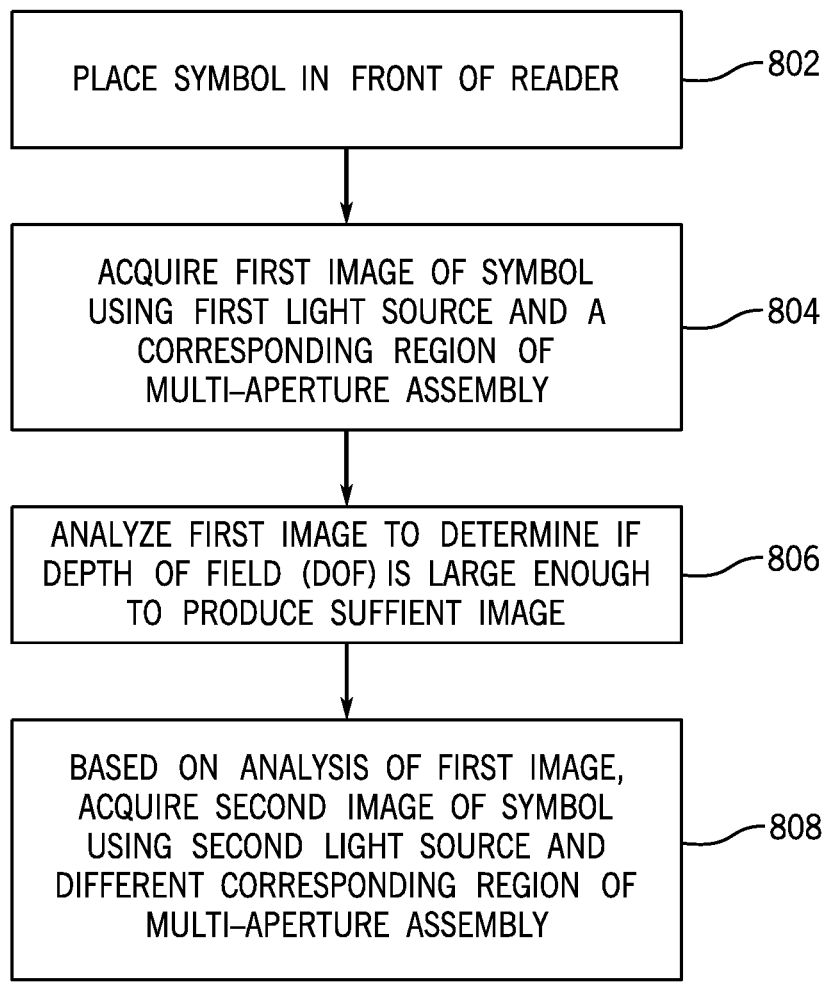
FIG. 8 illustrates a method for using a multi-aperture assembly, such as to maximize depth of field for imaging small codes on an object in accordance with an embodiment of the technology.

In another embodiment, a dual aperture (or other multi-aperture) assembly may be utilized in a vision system to maximize DOF in hand held applications where the barcodes to be imaged are small codes as illustrated in FIG. 8. In this application, at block 802 a barcode can be placed in front of the handheld reader. At block 804, the visions system can include a liquid lens that can be used to focus the barcode. The reader may then be operated to take a first image of the barcode using a first light source and a corresponding region of the dual aperture assembly. In one embodiment, the region is the outer region or large aperture so that the first image is acquired with the largest possible aperture to maximize the use of the amount of light. The first image may then be analyzed at block 806 to determine if the DOF is large enough to produce a sufficient image. If the DOF is not large enough, at block 808 a second light source associated with a different region of the dual aperture assembly than the first light source is used to illuminate the barcode and acquire a second image. For example, the region of the dual aperture assembly associated with the second light source is an inner region (or small aperture) to increase the DOF.

Figure 9:
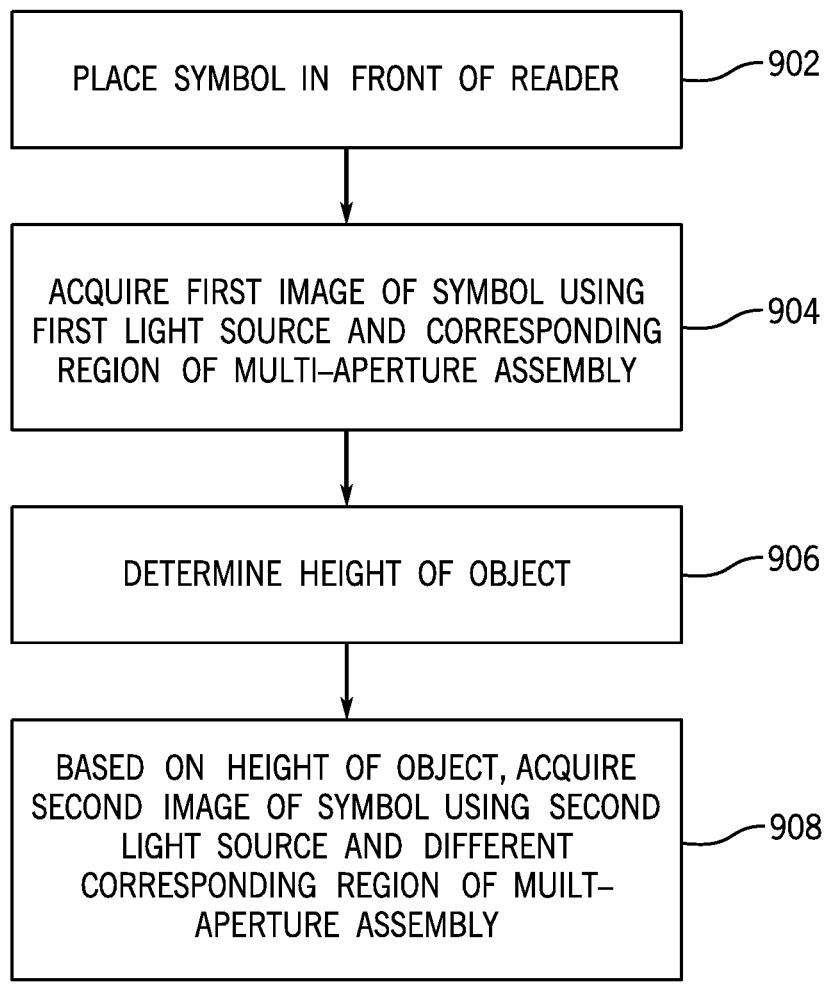
FIG. 9 illustrates a method for using a multi-aperture assembly, such as to maximize the depth of field and the amount of light in logistics applications in accordance with an embodiment of the technology.

In yet another embodiment, a dual aperture (or other multi-aperture) assembly may be utilized in a vision system to maximize the DOF and the amount of light in logistics applications as illustrated in FIG. 9. In logistics applications, both a maximized DOF and a maximized amount of light are important due to the high speeds involved (e.g., as objects are moved by a conveyor past a vision system). In this embodiment, by balancing the DOF and the amount of light for an image acquisition a vision system can provide sharp images with no motion blur. For example, a vision system can be a fixed mount system that is focused at a distance that allows a reader of the vision system to cover an expected (e.g., predetermined) maximum working distance. In addition, the system can be configured so that the resolution limit (i.e., for the minimum expected code size) is associated with the outer region or large aperture of the dual aperture system. In this application, at block 902 a barcode can be placed in front of the handheld reader. At block 904, the reader may then be operated to take a first image of the barcode using a first light source and a corresponding region of the dual aperture assembly. In one embodiment, the region is the outer region or large aperture which allows the reader to acquire a sharper image in terms of contrast since the modular transfer function (MTF) cut off increases. Accordingly, additional fine details can be determined by both the optics assembly and the image sensor.

However, in many cases, a single aperture size may not be sufficient for optimal imaging over the entire DOF that is possible for the imaging system. To ensure that the entire DOF is covered, different regions of a multi-aperture assembly can be used depending on the distance between a target and an imaging device, and a smaller aperture region can be selectively used only when the distance is small enough that the amount of light admitted by the multi-aperture assembly is less critical. In this regard, in some embodiments, a dimension of the object being imaged may be determined during runtime. For example, a height of the object can be determined at block 906 using, for example, a time of flight (TOF) camera positioned near the object and in communication with the reader. The measured height of the object can then be compared to a predetermined height threshold. If the height is above the threshold, at block 908 a second light source associated with a different region of the dual aperture assembly than the first light source can be used to illuminate the barcode and acquire a second image. For example, the region of the dual aperture assembly associated with the second light source can be an inner region (or small aperture). When the object height is above the height threshold, the vision system can change the light source for illumination to change from the larger aperture to the small aperture to cover the DOF at close distances, where the amount of light is less important because the barcode is passing closer to the reader. In other words, the height threshold for the object may be used control the light source and dual aperture assembly to acquire an image of the barcode at a large working distance using the outer region or large aperture and to acquire an image of the barcode at a near working distance using the inner region or small aperture.

The foregoing has been a detailed description of illustrative embodiments of the technology. Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present disclosure, what has been described herein is merely illustrative of the application of the principles of the present disclosure. Also, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Accordingly, the description is meant to be taken only by way of example, and not to otherwise limit the scope of this disclosure.

In some embodiments, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the technology can be implemented as a set of instructions, tangibly embodied on a non-transitory computer-readable media, such that a processor device can implement the instructions based upon reading the instructions from the computer-readable media. Some embodiments of the technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the technology. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The invention claimed is:

1. A machine vision system comprising:
an optics assembly with a fixed multi-aperture assembly and at least one lens;
a sensor assembly including an image sensor and a processor device; and
an illumination assembly;
the illumination assembly being configured to selectively illuminate an object for image acquisition using a first type of light or a second type of light;
the fixed multi-aperture assembly having an inner region and an outer region, the inner region being configured to pass the first and second types of light and the outer region being configured to filter the first type of light and pass the second type of light, so that illumination with the second type of light provides a larger light aperture than illumination with the first type of light; and
the processor device being configured to:
select one of the first or second types of light, based on analyzing at least one of a first image acquired by the sensor assembly or a first image acquisition process for the first image, wherein the first image is acquired or the first image acquisition process includes using one of the first or second types of light to illuminate the object; and
control the machine vision system to acquire a second image using the selected one of the first or second types of light;
wherein the processor device is configured to select the at least one of the first or second types of light based on one or more of:
determining that an exposure time for the first image acquisition process exceeds a threshold exposure time;
identifying a saturated region of the first image;
identifying at least one of a hot spot or a region of stray light in the first image;
determining a distance to a target object included in the first image; or
determining a dimension of an object included in the first image.

2. An apparatus for controlling a depth of field for a reader in a vision system, the apparatus comprising:
an optics assembly comprising:
a dual aperture assembly having an inner region and an outer region; and
at least one lens;
an image sensor;
a first light source configured to generate a first light beam that is associated with the inner region of the dual aperture assembly;
a second light source configured to generate a second light beam that is associated with the outer region of the dual aperture; and
a processor device in communication with the optics assembly, the first light source, and the second light source, the processor device configured to control the depth of field of the reader by selecting one of the first light source or the second light source to illuminate an object to acquire an image of the object using only the selected one of the first light source and the second light source, the selection being based on at least one parameter of the vision system including based on one or more of:
determining that an exposure time for a first image acquisition process for a first image exceeds a threshold exposure time;
identifying a saturated region of the first image;
identifying at least one of a hot spot or a region of stray light in the first image;
determining a distance to a target object included in the first image; or
determining a dimension of an object included in the first image.

3. The apparatus according to claim 2, wherein the inner region defines a first aperture to provide a first depth of field; and
wherein the outer region and the inner region define a second aperture, larger than the first aperture, to provide a second depth of field smaller than the first depth of field.

4. The apparatus according to claim 2, wherein the at least one lens includes a liquid lens.

5. The apparatus according to claim 2, wherein the first image is acquired with the reader using at least one of the inner region or the outer region of the dual aperture assembly, wherein the at least one parameter is associated with one or more of an element of the vision system or with the object.

6. The apparatus according to claim 2, wherein the first light beam has a first wavelength and the second light beam has a second wavelength that is different from the first wavelength; and
wherein the outer region of the dual aperture assembly is configured to pass the second wavelength but not the first wavelength.

7. The apparatus according to claim 2, wherein the first light beam has a first polarization and the second light beam has a second polarization that is different from the first polarization; and
wherein the outer region of the dual aperture assembly is configured to pass the light with the second polarization but not light with the first polarization.

8. A method for controlling a depth of field for a reader in a vision system, the method comprising:

acquiring a first image of an object using a first light beam of a first type of light to illuminate the object and a first region of a multi-aperture assembly that is associated with the first type of light;

determining at least one parameter associated with the first image;

based on the at least one parameter, acquiring a second image of the object using a second light beam of a second type of light to illuminate the object and a second region of the multi-aperture assembly that is associated with the second type of light, the second image having a different depth of field than the first image;

wherein the at least one parameter includes one or more of:
  an exposure time for acquisition of the first image and the second image is acquired based on comparing the exposure time to a maximum exposure time threshold;
  saturation values for at least one saturated area in the first image;
  pixel values for at least one hot spot or stray light region in the first image;
  determining a distance to the object included in the first image; or
  a dimension of the object.

9. The method according to claim 8, wherein the at least one parameter is an exposure time for acquisition of the first image and wherein the first light beam has a first wavelength and the first region of the multi-aperture assembly is an inner region and wherein the second light beam has a second wavelength different from the first wavelength and the second region of the multi-aperture assembly is an outer region.

10. The method according to claim 8, wherein the at least one parameter includes saturation values for at least one saturated area in the first image and wherein the first light beam has a first polarization and the second light beam has a second polarization different from the first polarization.

11. The method according to claim 8, wherein the at least one parameter includes pixel values for at least one hot spot or stray light region in the first image and wherein the first light beam has one or more of a first polarization or a first color value and the first region of the multi-aperture assembly is an outer region and wherein the second light beam has one or more of a second polarization different from the first polarization or a second color value different from the first color value and the second region of the multi-aperture assembly is an inner region.

12. The method according to claim 11, wherein the second image of the object includes a symbol and the symbol is a direct part marking symbol.

13. The method according to claim 8, further comprising analyzing the object within the second image without combining the first and second images.

14. The method according to claim 8, wherein the first region of the multi-aperture assembly is an outer region and is configured to pass the second type of light but not the first type of light; and
  wherein the second region of the multi-aperture assembly is an inner region and is configured to pass the first and second types of light.

15. The method according to claim 8, wherein the at least one parameter is a dimension of the object and wherein the first light beam has a first wavelength and the first region of the multi-aperture assembly is an outer region and wherein the second light beam has a second wavelength different from the first wavelength and the second region of the multi-aperture assembly is an inner region.

* * * * *